US011443213B2

(12) United States Patent
Karanam et al.

(10) Patent No.: US 11,443,213 B2
(45) Date of Patent: Sep. 13, 2022

(54) SYSTEM AND METHOD FOR APPROXIMATE REASONING USING ONTOLOGIES AND UNSTRUCTURED DATA

(71) Applicant: International Business Machines Corporation, Armonk, NY (US)

(72) Inventors: Hima Prasad Karanam, Bangalore (IN); Shajith Ikbal Mohamed, Chennai (IN); Sumit Bhatia, New Delhi (IN); Sumit Neelam, Bangalore (IN); L. Venkata Subramaniam, New Delhi (IN); Udit Sharma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1050 days.

(21) Appl. No.: 16/117,992

(22) Filed: Aug. 30, 2018

(65) Prior Publication Data

US 2020/0074334 A1 Mar. 5, 2020

(51) Int. Cl.
*G06N 5/04* (2006.01)
*G06N 20/00* (2019.01)
(Continued)

(52) U.S. Cl.
CPC .......... *G06N 5/048* (2013.01); *G06F 16/334* (2019.01); *G06N 5/022* (2013.01); *G06N 5/04* (2013.01); *G06N 20/00* (2019.01)

(58) Field of Classification Search
CPC ........ G06N 5/048; G06N 20/00; G06N 5/022; G06N 5/04; G06F 16/334
See application file for complete search history.

(56) References Cited

U.S. PATENT DOCUMENTS

| 8,775,356 B1 | 7/2014 | Chen et al. |
| 2008/0040308 A1 | 2/2008 | Ranganathan et al. |
(Continued)

FOREIGN PATENT DOCUMENTS

| CN | 101436206 A | 5/2009 |
| CN | 105550189 A | 5/2016 |

OTHER PUBLICATIONS

Haase et al., "Ontology Learning and Reasoning—Dealing with Uncertainty and Inconsistency", In: "Uncertainty Reasoning for the Semantic Web I", Springer, Berlin, Heidelberg., 2008, pp. 366-384. (Year: 2008).*

(Continued)

*Primary Examiner* — Daniel T Pellett
(74) *Attorney, Agent, or Firm* — Ryan, Mason & Lewis, LLP

(57) ABSTRACT

Methods, systems and computer program products for query processing are provided herein. A computer-implemented method includes receiving a first query from a user, determining whether the first query is capable of being answered using symbolic reasoning performed on data of a symbolic knowledge base, and executing the symbolic reasoning to generate a first query answer in response to a determination that the first query is capable of being answered using the symbolic reasoning. Axioms are extracted from a plurality of documents when it is determined that a second query is not capable of being answered using the symbolic reasoning. The method further includes determining whether the axioms are consistent with the symbolic knowledge base, and generating a second query answer based on the axioms in response to a determination that the one or more axioms are consistent with the symbolic knowledge base.

15 Claims, 6 Drawing Sheets

(51) Int. Cl.
    *G06N 5/02*        (2006.01)
    *G06F 16/33*       (2019.01)

(56) References Cited

U.S. PATENT DOCUMENTS

2016/0179945 A1    6/2016   Lastra Diaz et al.
2017/0206797 A1*  7/2017   Solomon ................ G06N 3/006

OTHER PUBLICATIONS

Kim, Jin-Dong, and K. Bretonnel Cohen. "Natural language query processing for SPARQL generation: A prototype system for SNOMED CT." Proceedings of biolink. vol. 32. 2013. (Year: 2013).*
skymind.ai, "Symbolic Reasoning (Symbolic AI) and Machine Learning," skymind.ai/wiki/symbolic-reasoning, Aug. 22, 2018, 18 pages.
techopedia.com, "Knowledge Base (klog)," https://www.techopedia.com/definition/2511/knowledge-base-klog, Aug. 22, 2018, 2 pages.
tinkerpop.apache.org, "Apache TinkerPop—The Gremlin Graph Traversal Machine and Language," https://tinkerpop.apache.org/gremlin.html, 2018, 6 pages.
Cambridge Semantics, "Getting Started with Anzo—Key Anzo Concepts and Vocabulary," http://supportcenter.cambridgesemantics.com/docs/help/en-US/GettingStarted/3.5/KeyAnzoConceptsandVocabulary, 2018, 3 pages.
Wikipedia, "Information Retrieval," https://en.wikipedia.org/wiki/Information_retrieval, Jul. 3, 2018, 9 pages.
Wikipedia, "Knowledge Base," https://en.wikipedia.org/Knowledge_base, May 31, 2018, 3 pages.
Wikipedia, "Ontology (Information Science)," https://en.wikipedia.org/wiki/Ontology_(information_science), Aug. 21, 2018, 17 pages.
Wikipedia, "Precision and Recall," https://en.wikipedia.org/wiki/Precision_and_recall, Aug. 3, 2018, 8 pages.
Wikipedia, "SPARQL," https://en.wikipedia.org/wiki/SPARQL, Aug. 9, 2018, 5 pages.
Wikipedia, "Symbolic Artificial Intelligence," https://en.wikipedia.org/wiki/Symbolic_artificial_intelligence, May 18, 2018, 2 pages.
atlassian.com, "What's a Knowledge Base and Why You Need it," https://www.atlassian.com/it-unplugged/knowledge-management/what-is-a-knowledge-base, 2018, 9 pages.

* cited by examiner

SYSTEM AND METHOD FOR APPROXIMATE REASONING USING ONTOLOGIES AND UNSTRUCTURED DATA

FIELD

The present invention relates to query processing, and more specifically, to utilizing information retrieval and symbolic reasoning to generate query results.

BACKGROUND

Knowledge bases may be built around structured and unstructured data, and generally use artificial intelligence to store data and infer conclusions about the data which can be retrieved by users. Structured data in a knowledge base are typically represented in one or more ontologies including, for example, categories, properties and/or relations between concepts, data and/or entities. Symbolic reasoning uses structured data to infer precise answers to queries based on, for example, previous experience stored as part of the knowledge base. Symbolic reasoning refers to a collection of artificial intelligence methods that are based on high-level symbolic (e.g., human-readable) representations of problems, logic and searches. Rules engines, expert systems and/or knowledge graphs are some implementations of symbolic reasoning. Symbolic reasoning systems comprise nested if-then statements drawing conclusions about entities and/or concepts and their relations, which are expressed in well understood semantics. Symbolic reasoning reduces query answering to consistency checks. However, capturing whole domain knowledge into symbolic form is very difficult, and creating such knowledge requires manual intervention and consumes large amounts of human and computing resources.

Information retrieval (IR) corresponds to retrieving data from one or more collections of information resources in response to a query. The data are typically in an unstructured form (e.g., text in documents). IR is associated with high recall values, producing a relatively large number retrieved relevant results when compared with the total amount of relevant results. However, IR results do not necessarily match a query, and may not provide an exact answer to query, requiring a user to analyze returned textual results to derive the answer.

There is a need for systems and techniques which can take advantage of the high recall of IR and the reasoning methods associated with symbolic reasoning to generate useful answers to queries.

SUMMARY

Embodiments of the invention provide techniques for query processing, and more particularly, to combining techniques and advantages associated with information retrieval and symbolic reasoning to generate query answers.

According to an exemplary embodiment of the present invention, a computer-implemented method comprises receiving a first query from at least one user, determining whether the first query is capable of being answered using symbolic reasoning performed on data of a symbolic knowledge base, executing the symbolic reasoning to generate a first query answer in response to a determination that the first query is capable of being answered using the symbolic reasoning; extracting one or more axioms from a plurality of documents in response to a determination that a second query is not capable of being answered using the symbolic reasoning; determining whether the one or more axioms are consistent with the symbolic knowledge base; and generating a second query answer based on the one or more axioms in response to a determination that the one or more axioms are consistent with the symbolic knowledge base.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Illustrative embodiments of the invention may be described herein in the context of illustrative methods, systems and devices for executing and responding to a query. However, it is to be understood that embodiments of the invention are not limited to the illustrative methods, systems and devices but instead are more broadly applicable to other suitable methods, systems and devices.

Embodiments of the present invention advantageously combine symbolic reasoning and information retrieval (IR) methods to generate query answers, where no such combination was previously proposed or implemented. One or more embodiments of the present invention further utilize methods for expanding keywords based on symbolic reasoning to improve search precision, and introduce techniques for retrieving axioms from retrieved text documents. According to an embodiment of the present invention, the retrieved axioms are checked for consistency with a symbolic knowledge base so that consistent axioms can be added to the knowledge base and used to generate query answers through symbolic reasoning. Additional retrieved axioms may be added to the knowledge base with human intervention or automatically.

The methods and systems of the embodiments of the present invention also advantageously provide solutions for responding to queries when symbolic reasoning cannot be performed by extracting axioms from relevant documents retrieved using IR methods, and subsequently checking for consistency between these extracted axioms and the knowledge base. Embodiments of the present invention also address the problems of consistency failures by presenting combined results from symbolic reasoning and IR.

Embodiments of the present invention provide the advantage of determining whether to generate an answer to a query using a symbolic reasoning process and/or an information retrieval process. The determination is based on (i) whether the entire query is capable of being answered using symbolic reasoning performed on data of a symbolic knowledge base; or (ii) whether only part of the query is capable of being answered using the symbolic reasoning.

Thus, illustrative embodiments address the issue of how and when to combine the techniques and advantages associated with information retrieval and symbolic reasoning to generate query answers.

Figure 1:
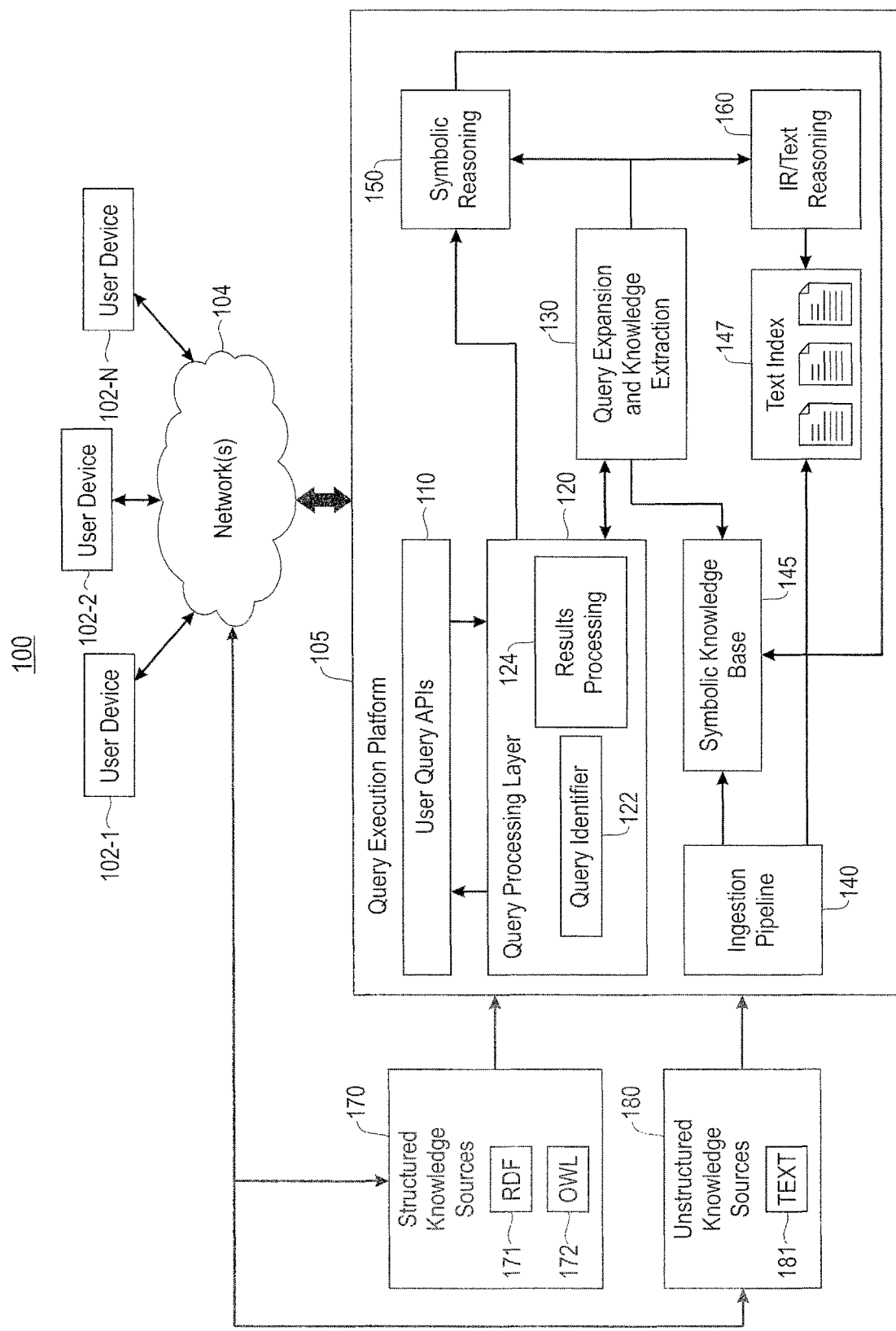
FIG. 1 depicts a block diagram of an information processing system including a query execution platform configured for executing and responding to one or more queries, according to an exemplary embodiment of the present invention.

FIG. 1 depicts a block diagram of an information processing system including a query execution platform configured for executing and responding to one or more queries, according to an exemplary embodiment of the present invention. As shown in FIG. 1 by lines and/or arrows, the components of the system 100 are operatively coupled to each other via, for example, physical connections, such as wired and/or direct electrical contact connections, and/or wireless connections, such as, for example, Wi-Fi™, BLUETOOTH®, IEEE 802.11, and/or networks, including but not limited to, a local area network (LAN), wide area network (WAN), cellular network, ad hoc networks, WANET, satellite network or the Internet. For example, a network 104 can operatively link one or more components 102-1, 102-2, . . . , 102-N and 105 of the system 100.

By way of non-limiting example, in accordance with an embodiment of the present invention, referring to FIG. 1, the system 100 includes user devices 102-1, 102-2, . . . 102-N (collectively "user devices 102). The variable N is an integer greater than one. The user devices 102 communicate over the network 104 with a query execution platform 105.

The user devices 102 can comprise, for example, desktop, laptop or tablet computers, mobile telephones, or other types of processing devices capable of communicating with the query execution platform 105 over the network 104. The outputs from the query execution platform 105 including, for example, query results and answers, are communicated to the user devices 102 via, for example, network(s) 104.

The query execution platform 105 includes user query application programming interfaces (APIs) 110. The user query APIs 110 include sets of subroutine definitions, protocols, and/or tools for building software, so that the APIs 110 can define communication between software components, receive queries from and transmit query results to one or more users via the network(s) 104 and the user devices 102.

One or more structured and unstructured knowledge sources 170 and 180 are operatively connected to the query execution platform 105 via, for example, the physical connections, such as wired and/or direct electrical contact connections, and/or the wireless connections as noted herein above, and received at the query execution platform 105 via the ingestion pipeline 140. The ingestion pipeline 140 is configured to ingest (e.g., receive and process) symbolic and textual data, and distribute the data to appropriate data stores in the query execution platform 105, such as the symbolic knowledge base 145 and the text index 147.

The symbolic data include, but are not necessarily limited to, structured and highly structured sources comprising a formalized body of knowledge in the form of, for example, knowledge graphs, ontologies, and/or taxonomies. Such knowledge can take many forms. One common form is the Web Ontology Language (also referred to as OWL) 172, which is used for establishing entities, relationships, and properties. Formalizing knowledge in this way helps systems interchange, update, modify and store relationships. A common tool for creating, editing and working with ontologies created in OWL is the Protégé framework.

The Resource Description Framework (RDF) 171 is another formalization of knowledge that underlies, for example, online, semantically linked data sources. The query execution platform 105, including the symbolic reasoning component 150 is configured to take advantage of knowledge formalized and stored in one or more of these formalisms to perform symbolic reasoning. Symbolic reasoning refers to the use of structured data to infer precise or approximate answers to queries based on, for example, previous experience stored as part of the symbolic knowledge base 145. Symbolic reasoning utilizes a collection of artificial intelligence methods that are based on high-level symbolic (e.g., human-readable) representations of problems, logic and searches. Rules engines, expert systems and/or knowledge graphs are some implementations of symbolic reasoning. Symbolic reasoning systems may comprise nested if-then statements drawing conclusions about entities and/or concepts and their relations, which are expressed in well understood semantics. According to one or more embodiments, a symbolic reasoning component 150 implements one or more reasoning APIs, such as, for example, consistency check and classification APIs. Each query is rewritten to form a consistency check and then query answering is performed accessing the symbolic knowledge base 145. A symbolic reasoning component 150 includes a set of algorithms (e.g., artificial intelligence and/or machine learning algorithms) to operate on the symbolic knowledge base 145. Some examples of symbolic reasoning components can include, but are not limited to, HermitT 1.3.5, TrOWL 0.8.1, Fact++ 1.5.2, RacerPro 2.0, Pellet 2.3.0, or other reasoners for ontologies.

The unstructured knowledge sources 180, include, for example, unstructured data, such as, but not necessarily limited to, text documents 181. Text documents 181 can be any domain documents that are relevant to the domain. For example, in the case of the medical domain, text documents may include can be PubMed articles, and in the case of a general knowledge domain, text documents may include articles, news publications, and the like.

Figure 2:
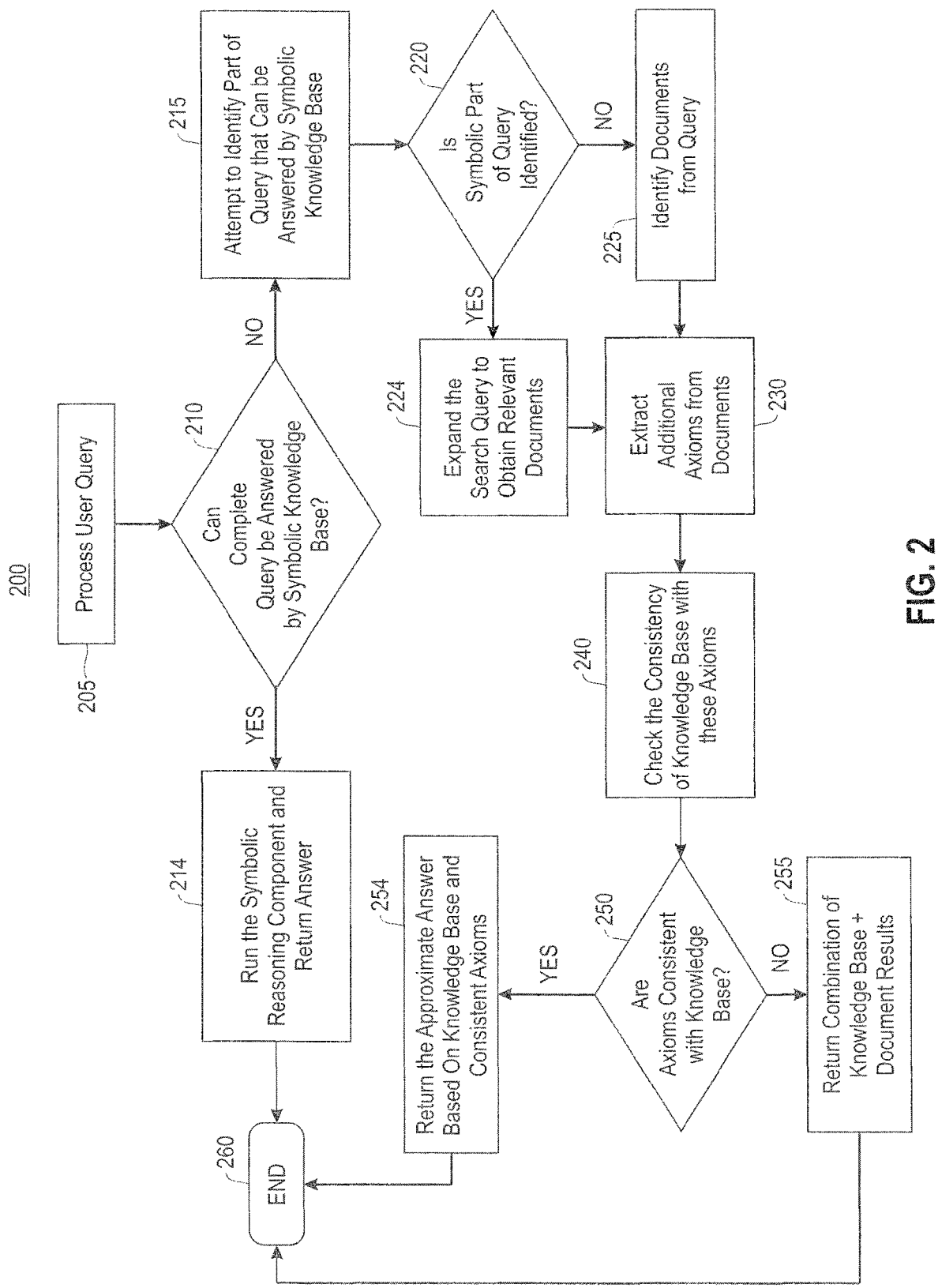
FIG. 2 depicts a process for executing and responding to a query, according to an exemplary embodiment of the present invention.

The query execution platform 105 includes a query processing layer 120, which includes a query identifier 122 and a results processing component 124. Given a natural language query from a user received at the query execution platform 105 via the user query APIs 110, the query processing layer 120, and, more specifically, the query identifier 122 determines whether the entire query is capable of being answered using symbolic reasoning performed by, for example, the symbolic reasoning component 150 on data of the symbolic knowledge base 145. In other words, the query identifier 122 determines whether the query is a complete symbolic query, meaning that the query can be answered completely by symbolic reasoning with reference to the symbolic knowledge base 145. A complete symbolic query may be expressed in SPARQL ("SPARQL Protocol and RDF Query Language") or in Description Logic formats. The query processing layer 120 and/or the user query APIs may be configured to convert a natural language query into a different format, such as, for example, SPARQL or Description Logic. Referring to FIG. 2, which depicts a process for executing and responding to a query, according to an exemplary embodiment of the present invention, such conversion from natural language is depicted is block 205.

Referring further to FIG. 2, in the process 200, if the query identifier 122 determines that an entirety of an incoming query is capable of being answered using symbolic reasoning (Yes at block 210), then at block 214, the symbolic reasoning is performed via the symbolic reasoning component 150. The symbolic reasoning generates a query answer to end the process at block 260. In this case, a structured query to the underlying knowledge base 145 provides an accurate answer to the query without using information retrieval (IR). The results processing component 124 receives the query result and interfaces with the user query APIs 110 to return the query result to a user in the appropriate format.

In accordance with one or more embodiments of the present invention, existing query understanding and ontologies can be used to map a natural language user query to the symbolic knowledge base 145. For example, an ontology in the knowledge base 145 and the user query can be used to identify a portion of an ontology needed for answering the query and then a complete or partial answer to the query can be generated. The portion of query matched to the symbolic space and an understanding what the query is requesting can be used to understand the whether a complete answer to the query can be generated.

Referring back to FIG. 2, if the query identifier 122 determines that an entirety of an incoming query is not capable of being answered using symbolic reasoning (No at block 210), then at blocks 215 and 220, the query identifier 122 determines whether part of the query is capable of being answered using the symbolic reasoning. For example, at block 215, if the complete query is not able to be translated to an underlying knowledge base query, then the system attempts to identify part of the query that can be used to obtain precise answers via the symbolic knowledge base 145, which can, in turn, be used to expand the query to obtain relevant documents from the unstructured data sources 180. At block 220, the query identifier 122 confirms whether a part of the query which is capable of being answered using the symbolic reasoning can be identified.

Referring back to FIG. 1, the query execution platform 105 includes a query expansion and knowledge extraction component 130. As shown in FIG. 2, if a part of the query which is capable of being answered using the symbolic reasoning can be identified, the query is expanded to obtain relevant documents from, for example, the text index 147 (block 224). The query may be expanded to include additional keywords which correspond to one or more elements of an ontology. For example, the query may be expanded by using Tbox data in the symbolic knowledge base 145 to include concept and/or role hierarchies as additional keywords. In addition, constructs, such as, for example, "like," "same as," and/or "different from" can be implemented to add additional keywords or exclude keywords from the query.

Following query expansion, referring to block 230 of FIG. 2, the query expansion and knowledge extraction component 130 extracts additional axioms from a plurality of documents. The plurality of documents comprise, for example, unstructured textual documents retrieved via IR in response to the query. The axioms may comprise assertion (e.g., instance) and/or terminological components (Abox and Tbox). The relevant documents from the IR are used to extract additional facts (e.g., axioms), which may then be added to the knowledge base 145 depending on whether they are consistent with the knowledge base 145, and if consistent, the axioms can be presented to users in query results as approximate answers to the query.

Open extraction techniques can be used to extract the additional axioms from the relevant documents. These techniques include, for example, extracting relation triples based on the existing TBox coming from an existing knowledge base, where relationships can be treated as predicates for extracting additional facts, and concept types can be used as ways to retrieve individuals. Some domain dictionaries can be built from the existing knowledge base to support such extraction. Open information extraction (OpenIE) type systems can be used to discover new entities and relationships from the unstructured documents, which can be refined further to match the underlying knowledge base schema. The additional axioms can be added to the symbolic knowledge base 145 to augment the symbolic knowledge base 145. Extraction can be driven by the types and relations existing, for example, in one or more ontologies, in the symbolic knowledge base.

Referring to blocks 240 and 250 in FIG. 2, the query expansion and knowledge extraction component 130 determines whether the axioms are consistent with the knowledge base 145. Referring to block 254, if the axioms are consistent with the knowledge base 145, then the axioms can be presented to users in query results as approximate answers to the query. The results processing component 124 receives the query result and interfaces with the user query APIs 110 to return the query result to a user in the appropriate format.

The axioms may be stored in a temporary knowledge base (not shown) pending a consistency determination. According to one or more embodiments of the present invention, only facts that do not result in the symbolic knowledge base being inconsistent are added to the symbolic knowledge base 145 for query answering and facts deemed to be inconsistent are ignored or presented to users as plain search answers for a user to analyze. Consistency checks are performed by the symbolic reasoning component 150. Consistency checking includes checking whether all of the terminological (TBox) and assertion (ABox) axioms are consistent with the symbolic knowledge base 145. Identifying consistency of TBox axioms includes checking if all of the terminological concepts and their relationships do not contradict each other. Identifying consistency of ABox axioms includes determining that the ABox axioms are adhering to the TBox definitions and not creating any contradictions. For example, assuming there is a TBox definition that states that only females can be mothers, and a person X is defined as being male (Male(X)), if a fact is added which states that X is a mother of Y (Mother(X,Y)), then this fact cannot be deemed consistent since a male person cannot be a mother as per the TBox definition. Consistency checks discover these and other kinds of discrepancies in the terminological and instance (assertion) data.

In a basic example, a terminological component (Tbox) may be represented as LivesIn (US President, White House), LocatedAt (White House, Washington D.C.), where LivesIn ⊆LocatedAt. Assertion components (Abox) may be LivesIn (<Former US President Name>, <Current Residence> (not Washington D.C.) and LivesIn (<Current US President Name>, Washington D.C.). A query may state who is the President of the United States and in which city does he live? An IR portion of the query is "who is the President of the United States" and a symbolic reasoning portion is "in which city does he live." The query may return a first document (D1), which states that a former US President is the US President, resulting in the assertion component (e.g., axiom) US President (<Former US President Name>), and a second document (D2), which states that the current US President is the US President, resulting in the assertion component (e.g., axiom) US President (<Current US President Name>). The axiom from the first document D1 would be inconsistent with a knowledge base including structured data on the current US President, and the axiom from the second document D2 would be consistent with the knowledge base including structured data on the current US President.

Referring to block 255, when the extracted axioms are determined to be inconsistent with the symbolic knowledge base 145, the query execution platform generates a query answer based on a combination of the structured data from the symbolic knowledge base and the unstructured data from the plurality of documents. For example, in cases where symbolic reasoning cannot provide full answers, a partial or no result from the symbolic knowledge base 145 and higher ranked document results and extracted facts can be presented as query answers to users for review. The results processing component 124 receives the query result and interfaces with the user query APIs 110 to return the query answers to the users in the appropriate format.

As shown in FIG. 2, if a part of the query which is capable of being answered using the symbolic reasoning cannot be identified, the documents retrieved in response to the query using IR techniques are identified (block 225). For example, if no part of the user query is able to be translated into a query of the symbolic knowledge base 145 (e.g., no part of the query is capable of being answered using symbolic reasoning), then the IR/text reasoning component 160 uses IR as default mechanism to retrieve relevant documents from unstructured knowledge sources 180 via the text index 147. Then steps 230, 240 and 250 as described above are followed in attempt to obtain approximate answers based on the knowledge base 145. If no approximate answers can be obtained, then the query execution platform 105, via the IR/text reasoning component 160, runs a pure IR query and provides search answers to a user via the results processing component 124. The IR/text reasoning component 160 analyzes, for example, contextual text portions and documents.

Figure 3:
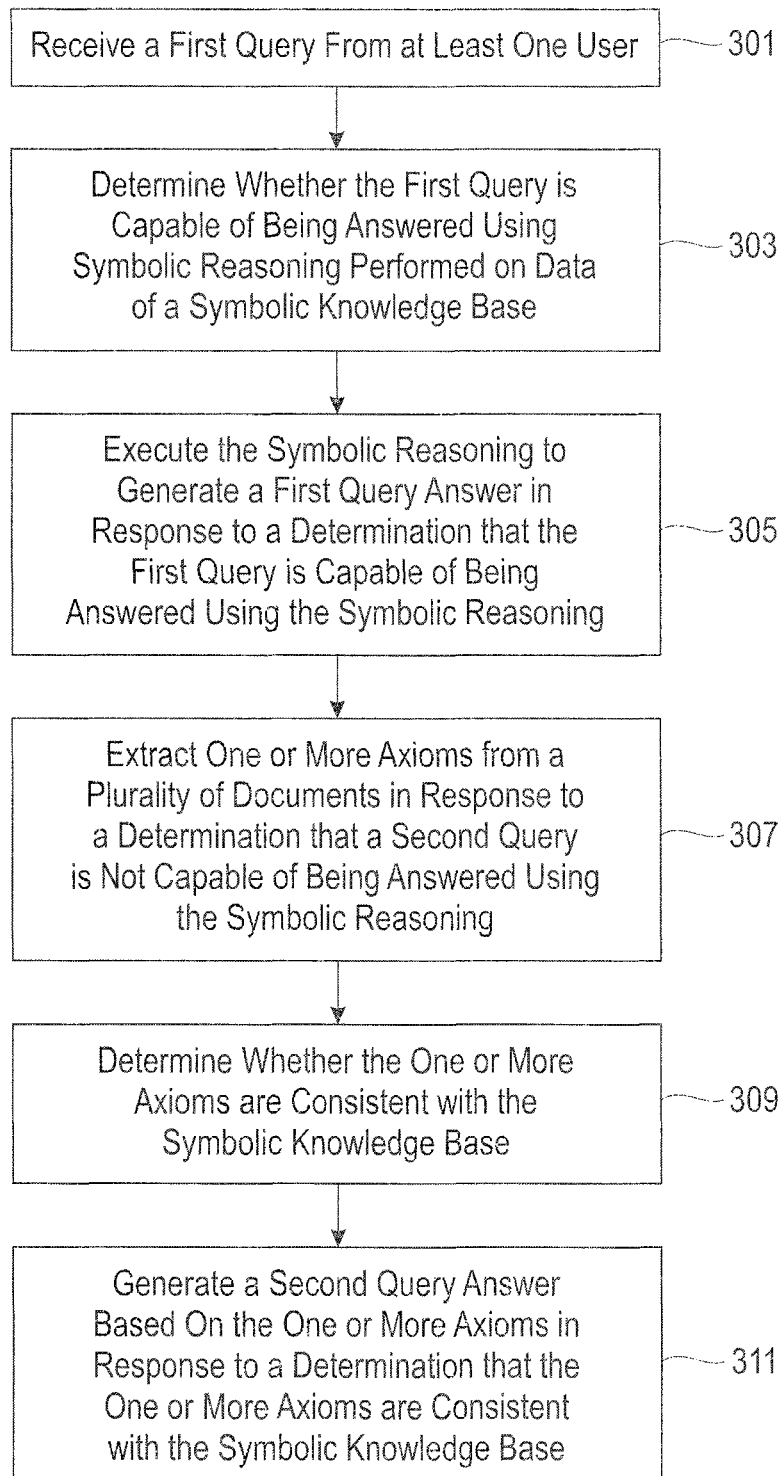
FIG. 3 depicts a process for executing and responding to a query, according to an exemplary embodiment of the present invention.

FIG. 3 is a flow diagram of a process multiple user interaction and gesture detection, according to an exemplary embodiment of the invention. Referring to FIG. 3, the process 300 includes, at block 301, receiving a first query from at least one user. The query may be a natural language query, and may be converted to a SPARQL format or a descriptive logic format.

At block 303, the process further includes determining whether the (entire) first query is capable of being answered using symbolic reasoning performed on data of a symbolic knowledge base, and at block 305, executing the symbolic reasoning to generate a first query answer in response to a determination that the (entire) first query is capable of being answered using the symbolic reasoning. The symbolic knowledge base comprises structured data represented in one or more ontologies. Executing the symbolic reasoning comprises (i) identifying a portion of an ontology in the symbolic knowledge base required for generating the first query answer; and (ii) generating the first query answer.

When it is determined that an (entire) second query is not capable of being answered using the symbolic reasoning, referring to block 307, one or more axioms are extracted from a plurality of documents. The plurality of documents may comprise unstructured textual documents, and the extracting can be driven by one or more relations in one or more ontologies in the symbolic knowledge base. The process may also include determining whether part of the query is capable of being answered using the symbolic reasoning in response to the determination that the entire query is not capable of being answered using the symbolic reasoning.

At block 309, the process 300 includes determining whether the one or more axioms are consistent with the symbolic knowledge base. The one or more axioms can comprise an assertion component and/or a terminological component. The one or more axioms determined to be consistent to the symbolic knowledge base are added to the symbolic knowledge base.

Referring to block 311, a second query answer is generated based on the one or more axioms in response to a determination that the one or more axioms are consistent with the symbolic knowledge base. Generating the second query answer comprises performing the symbolic reasoning in connection with at least part of the (second) query.

The process may further include expanding the query to include and/or exclude one or more keywords in response to the determination that the entire query is not capable of being answered, wherein the one or more keywords correspond to an element of an ontology.

A third query answer may be generated in response to a determination that the one or more axioms are inconsistent with the symbolic knowledge base, wherein the third query answer comprises a combined answer based on (i) structured data from the symbolic knowledge base; and (ii) unstructured data from the plurality of documents.

The present invention may be implemented via a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
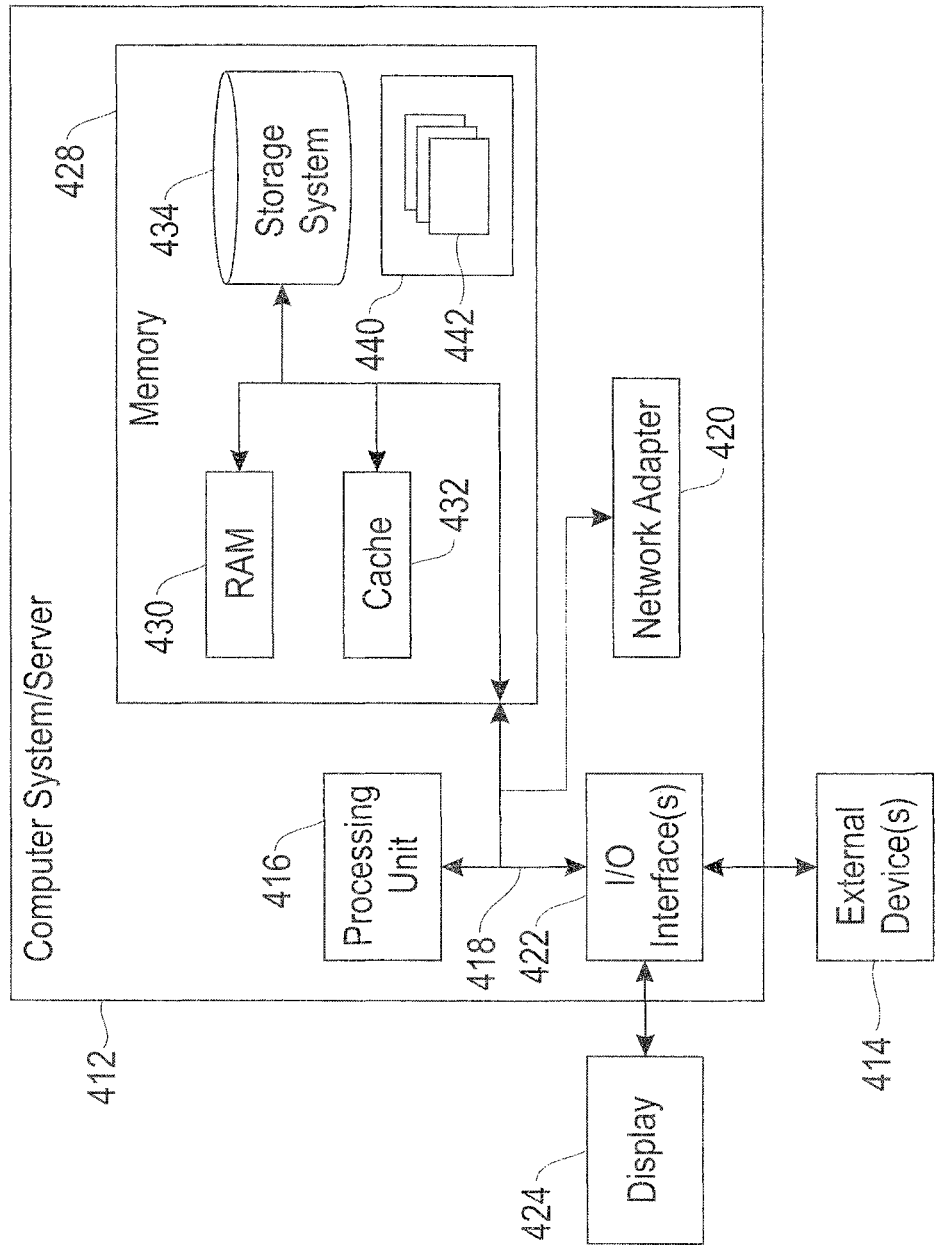
FIG. 4 depicts a computer system in accordance with which one or more components/steps of techniques of the invention may be implemented, according to an exemplary embodiment of the invention.

One or more embodiments can make use of software running on a general-purpose computer or workstation. With reference to FIG. 4, in a computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

The bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 412 typically includes a variety of computer system readable media. Such media may be any available media that is accessible by computer system/server 412, and it includes both volatile and non-volatile media, removable and non-removable media.

The system memory 428 can include computer system readable media in the form of volatile memory, such as RAM 430 and/or cache memory 432. The computer system/server 412 may further include other removable/non-removable, volatile/nonvolatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 418 by one or more data media interfaces. As depicted and described herein, the memory 428 may include at least one program product having a set (e.g., at least one) of program modules that are configured to carry out the functions of embodiments of the invention. A program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc., one or more devices that enable a user to interact with computer system/server 412, and/or any devices (e.g., network card, modem, etc.) that enable computer system/server 412 to communicate with one or more other computing devices. Such communication can occur via I/O interfaces 422. Still yet, computer system/server 412 can communicate with one or more networks such as a LAN, a general WAN, and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
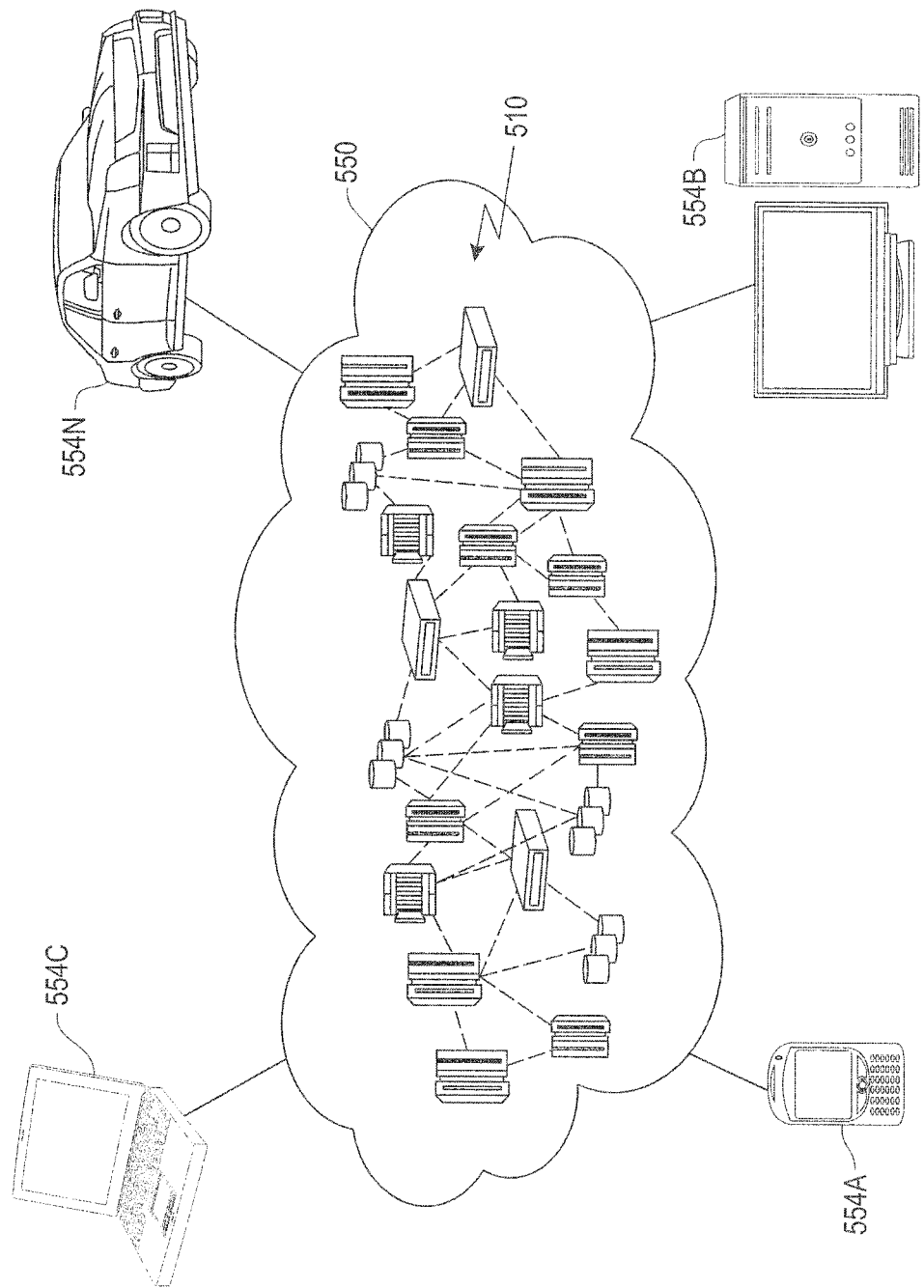
FIG. 5 depicts a cloud computing environment, according to an exemplary embodiment of the present invention.

Referring now to FIG. 5, illustrative cloud computing environment 550 is depicted. As shown, cloud computing environment 550 includes one or more cloud computing nodes 510 with which local computing devices used by cloud consumers, such as, for example, a PDA or a cellular telephone 554A, a desktop computer 554B, a laptop computer 554C, and/or an automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
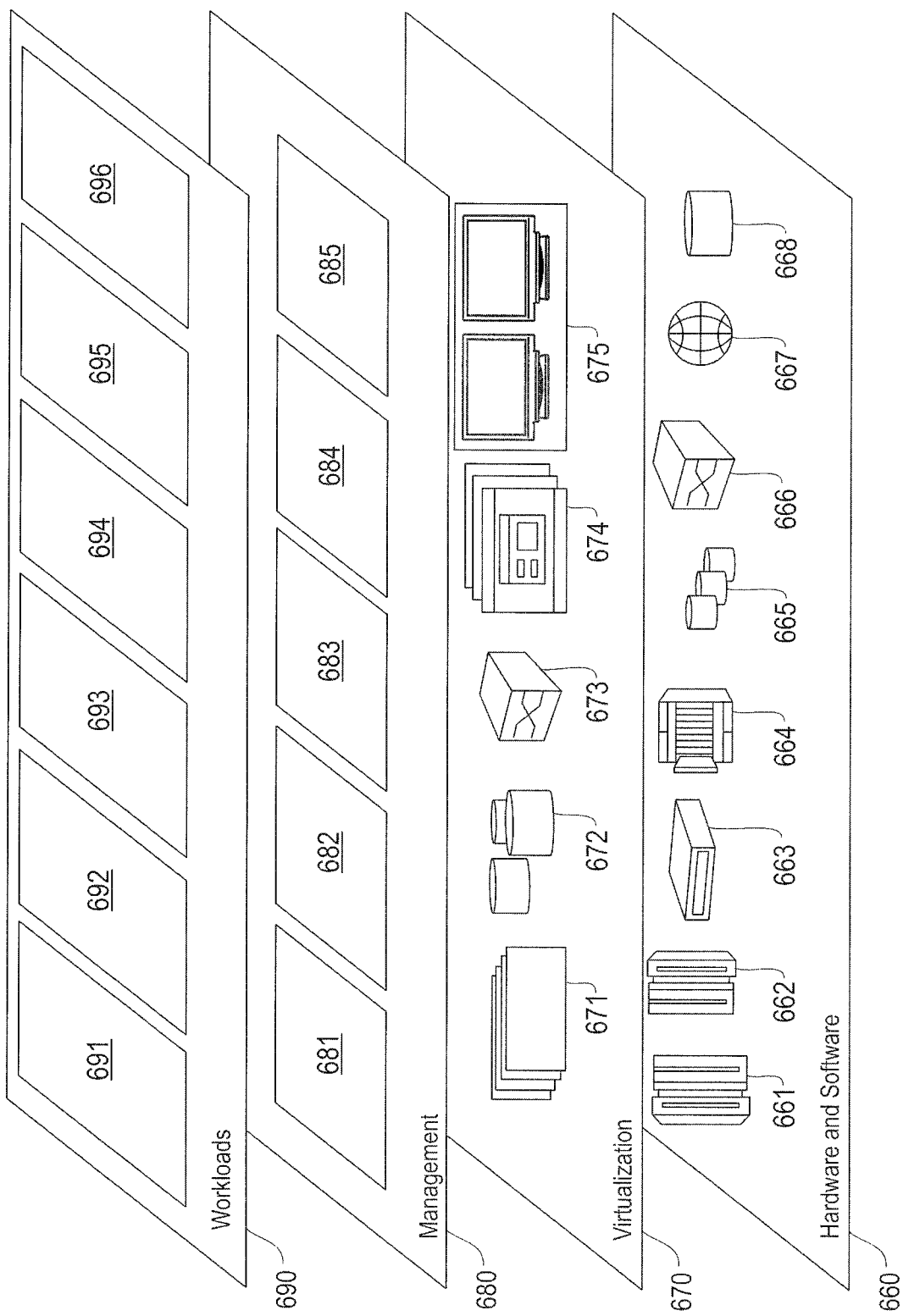
FIG. 6 depicts abstraction model layers, according to an exemplary embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and query execution 696, which may perform various functions described above with respect to system 100.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method, comprising:
    receiving a first query from at least one user, wherein the first query comprises a natural language format query;
    converting the first query from the natural language format to a SPARQL format
    determining whether the first query is capable of being answered using symbolic reasoning performed on data of a symbolic knowledge base;
    executing the symbolic reasoning to generate a first query answer in response to a determination that the first query is capable of being answered using the symbolic reasoning, wherein executing the symbolic reasoning comprises automatically processing data from at least a portion of the symbolic knowledge base using a set of one or more artificial intelligence algorithms and one or more portions of data derived from the first query;

receiving a second query from the at least one user, wherein the second query comprises a natural language format query;

converting the second query from the natural language format to a SPARQL format;

extracting one or more axioms from a plurality of documents in response to a determination that a second query is not capable of being answered using the symbolic reasoning;

determining whether the one or more axioms are consistent with the symbolic knowledge base; and generating a second query answer based on the one or more axioms in response to a determination that the one or more axioms are consistent with the symbolic knowledge base.

2. The computer-implemented method of claim 1, comprising:

determining whether part of a given query is capable of being answered using the symbolic reasoning in response to the determination that the given query is not capable of being answered.

3. The computer-implemented method of claim 1, comprising:

modifying a given query to at least one of (i) include one or more keywords and (ii) exclude one or more keywords in response to the determination that the given query is not capable of being answered using the symbolic reasoning.

4. The computer-implemented method of claim 3, wherein the one or more keywords correspond to one or more elements of an ontology.

5. The computer-implemented method of claim 1, wherein the one or more axioms comprise at least one of (i) an assertion component and (ii) a terminological component.

6. The computer-implemented method of claim 1, comprising:

adding the one or more axioms determined to be consistent to the symbolic knowledge base.

7. The computer-implemented method of claim 1, wherein the plurality of documents comprise unstructured textual documents.

8. The computer-implemented method of claim 1, wherein the symbolic knowledge base comprises structured data represented in one or more ontologies.

9. The computer-implemented method of claim 1, wherein said generating the second query answer comprises performing the symbolic reasoning in connection with at least part of the query.

10. The computer-implemented method of claim 1, wherein said executing the symbolic reasoning comprises (i) identifying a portion of an ontology in the symbolic knowledge base required for generating the first query answer and (ii) generating the first query answer.

11. The computer-implemented method of claim 1, wherein said extracting is driven by one or more relations in one or more ontologies in the symbolic knowledge base.

12. The computer implemented method of claim 1, comprising:

generating a third query answer in response to a determination that the one or more axioms are inconsistent with the symbolic knowledge base, wherein the third query answer comprises an answer based on (i) structured data from the symbolic knowledge base and (ii) unstructured data from the plurality of documents.

13. A computer program product, the computer program product comprising a computer readable storage medium having program instructions embodied therewith, the program instructions executable by a device to cause the device to:

receive a first query from at least one user, wherein the first query comprises a natural language format query;

convert the first query from the natural language format to a SPARQL format;

determine whether the first query is capable of being answered using symbolic reasoning performed on data of a symbolic knowledge base;

execute the symbolic reasoning to generate a first query answer in response to a determination that the first query is capable of being answered using the symbolic reasoning, wherein executing the symbolic reasoning comprises automatically processing data from at least a portion of the symbolic knowledge base using a set of one or more artificial intelligence algorithms and one or more portions of data derived from the first query;

receive a second query from the at least one user, wherein the second query comprises a natural language format query;

convert the second query from the natural language format to a SPARQL format;

extract one or more axioms from a plurality of documents in response to a determination that a second query is not capable of being answered using the symbolic reasoning;

determine whether the one or more axioms are consistent with the symbolic knowledge base; and generate a second query answer based on the one or more axioms in response to a determination that the one or more axioms are consistent with the symbolic knowledge base.

14. A system comprising:

a memory; and at least one processor coupled to the memory and configured for:

receiving a first query from at least one user, wherein the first query comprises a natural language format query;

converting the first query from the natural language format to a SPARQL format;

determining whether the first query is capable of being answered using symbolic reasoning performed on data of a symbolic knowledge base;

executing the symbolic reasoning to generate a first query answer in response to a determination that the first query is capable of being answered using the symbolic reasoning, wherein executing the symbolic reasoning comprises automatically processing data from at least a portion of the symbolic knowledge base using a set of one or more artificial intelligence algorithms and one or more portions of data derived from the first query;

receiving a second query from the at least one user, wherein the second query comprises a natural language format query;

converting the second query from the natural language format to a SPARQL format;

extracting one or more axioms from a plurality of documents in response to a determination that a second query is not capable of being answered using the symbolic reasoning;

determining whether the one or more axioms are consistent with the symbolic knowledge base; and generating a second query answer based on the one or more axioms in response to a determination that the one or more axioms are consistent with the symbolic knowledge base.

15. The system according to claim 14, wherein the at least one processor is further configured for:

determining whether part of a given query is capable of being answered using the symbolic reasoning in response to the determination that the given query is not capable of being answered.

* * * * *